US012576804B2

(12) United States Patent
Bortolan et al.

(10) Patent No.:  US 12,576,804 B2
(45) Date of Patent:      Mar. 17, 2026

(54) ASSEMBLY FOR CARRYING ELONGATED MEDIA ALONG A VEHICLE FRAME AND A VEHICLE

(71) Applicant: Volvo Truck Corporation, Gothenburg (SE)

(72) Inventors: Felipe Bortolan, São José dos Pinhais (BR); Lars Dahlström, Varberg (SE)

(73) Assignee: Volvo Truck Corporation, Gothenburg (SE)

( * ) Notice: Subject to any disclaimer, the term of this patent is extended or adjusted under 35 U.S.C. 154(b) by 0 days.

(21) Appl. No.: 19/089,767

(22) Filed: Mar. 25, 2025

(65) Prior Publication Data

US 2025/0319833 A1      Oct. 16, 2025

(30) Foreign Application Priority Data

Apr. 11, 2024    (EP) ..................................... 24169609

(51) Int. Cl.
B60P 3/40              (2006.01)
B60P 7/08              (2006.01)
(Continued)

(52) U.S. Cl.
CPC .............. B60R 16/08 (2013.01); B62D 21/17 (2013.01); B62D 65/16 (2013.01); B60R 16/00 (2013.01);
(Continued)

(58) Field of Classification Search
CPC ..... B60R 16/00; B60R 16/02; B60R 16/0207; B60R 16/0215; B60R 16/03; B60R 16/08;
(Continued)

(56) References Cited

U.S. PATENT DOCUMENTS

2008/0078890 A1 *   4/2008  Nelson .................... F16L 3/137
                                                                248/73
2009/0224111 A1    9/2009  Gilbreath
                            (Continued)

FOREIGN PATENT DOCUMENTS

DE            10145357 C1 *  5/2003   .......... B62D 29/004
DE      102021114035 A1 *  12/2022   ............ B60J 1/2027
                            (Continued)

OTHER PUBLICATIONS

Description Translation for FR 2963909 from Espacenet (Year: 2012).*

(Continued)

*Primary Examiner* — Jason D Shanske
*Assistant Examiner* — Daniel M. Keck
(74) *Attorney, Agent, or Firm* — Withrow & Terranova, PLLC

(57)              ABSTRACT

An assembly for carrying elongated media along a vehicle frame, the assembly comprising a structurally rigid elongated beam member having a longitudinal extension along a longitudinal direction of the assembly; two or more vehicle frame attachment members configured to attach the assembly to the vehicle frame; and at least one elongated media attachment member configured to attach at least one elongated media to the assembly, and an elongated media integrated in the structurally rigid elongated beam member. The disclosure also relates to a vehicle comprising a vehicle frame.

21 Claims, 5 Drawing Sheets

(51) Int. Cl.

| | |
|---|---|
| *B60P 7/12* | (2006.01) |
| *B60R 16/02* | (2006.01) |
| *B60R 16/08* | (2006.01) |
| *B60R 21/02* | (2006.01) |
| *B62D 21/17* | (2006.01) |
| *B62D 65/16* | (2006.01) |
| *F16L 1/06* | (2006.01) |
| *F16L 3/10* | (2006.01) |
| *F16L 3/22* | (2006.01) |
| *H02G 3/32* | (2006.01) |
| *B60R 16/00* | (2006.01) |
| *B60R 16/03* | (2006.01) |
| *B62D 21/00* | (2006.01) |
| *B62D 21/02* | (2006.01) |
| *B62D 23/00* | (2006.01) |
| *B62D 25/00* | (2006.01) |
| *B62D 25/02* | (2006.01) |
| *B62D 25/08* | (2006.01) |
| *B62D 27/00* | (2006.01) |
| *B62D 27/02* | (2006.01) |
| *B62D 29/00* | (2006.01) |
| *B62D 29/04* | (2006.01) |
| *B62D 33/00* | (2006.01) |
| *B62D 65/00* | (2006.01) |
| *B62D 65/02* | (2006.01) |

(52) U.S. Cl.
CPC ........... *B60R 16/02* (2013.01); *B60R 16/0207* (2013.01); *B60R 16/0215* (2013.01); *B60R 16/03* (2013.01); *B62D 21/00* (2013.01); *B62D 21/02* (2013.01); *B62D 23/00* (2013.01); *B62D 23/005* (2013.01); *B62D 25/00* (2013.01); *B62D 25/02* (2013.01); *B62D 25/025* (2013.01); *B62D 25/08* (2013.01); *B62D 27/00* (2013.01); *B62D 27/02* (2013.01); *B62D 27/023* (2013.01); *B62D 29/00* (2013.01); *B62D 29/001* (2013.01); *B62D 29/04* (2013.01); *B62D 29/041* (2013.01); *B62D 29/043* (2013.01); *B62D 29/045* (2013.01); *B62D 29/046* (2013.01); *B62D 29/048* (2013.01); *B62D 33/00* (2013.01); *B62D 65/00* (2013.01); *B62D 65/02* (2013.01)

(58) Field of Classification Search
CPC ........ B62D 21/00; B62D 21/02; B62D 21/17; B62D 23/00; B62D 23/005; B62D 25/00; B62D 25/02; B62D 25/025; B62D 25/08; B62D 27/00; B62D 27/02; B62D 27/023; B62D 29/00; B62D 29/001; B62D 29/04; B62D 29/041; B62D 29/043; B62D 29/045; B62D 29/046; B62D 29/048; B62D 33/00; B62D 65/00; B62D 65/02; B62D 65/16

USPC ................................................. 280/781, 782
See application file for complete search history.

(56)        References Cited

U.S. PATENT DOCUMENTS

| | | | | |
|---|---|---|---|---|
| 2020/0079200 A1* | 3/2020 | Suzuki | ..................... | B60K 1/00 |
| 2020/0255068 A1* | 8/2020 | De Smidt | ............. | B62D 33/06 |
| 2021/0253175 A1 | 8/2021 | Busuioc et al. | | |
| 2021/0253176 A1 | 8/2021 | Busuioc et al. | | |
| 2023/0415673 A1* | 12/2023 | Vreede | ................ | H02G 3/0456 |
| 2025/0346197 A1* | 11/2025 | Galin | ................. | B60R 16/0215 |

FOREIGN PATENT DOCUMENTS

| | | | | |
|---|---|---|---|---|
| EP | 2021638 B1 | 8/2011 | | |
| FR | 2926529 A1 * | 7/2009 | ............. | B62D 65/02 |
| FR | 2963909 A1 * | 2/2012 | ............. | B62D 21/17 |
| SE | 2450371 A1 * | 4/2024 | ............. | B62D 21/17 |
| WO | 2010125277 A1 | 11/2010 | | |
| WO | 2022108447 A1 | 5/2022 | | |

OTHER PUBLICATIONS

Extended European Search Report for European Patent Application No. 24169609.5, mailed Oct. 10, 2024, 11 pages.

\* cited by examiner

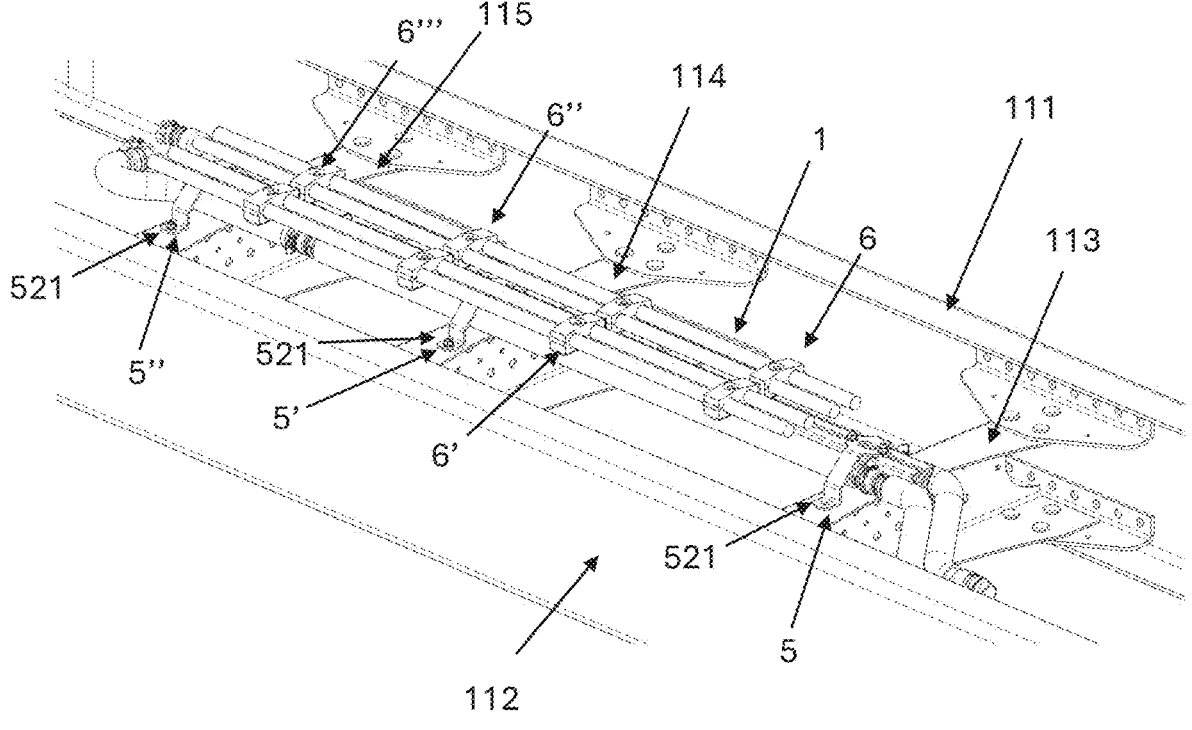
FIG. 6
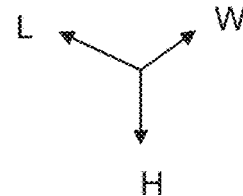

ASSEMBLY FOR CARRYING ELONGATED MEDIA ALONG A VEHICLE FRAME AND A VEHICLE

PRIORITY APPLICATIONS

The present application claims priority to European Patent Application No. 24169609.5, filed on Apr. 11, 2024, and entitled "ASSEMBLY FOR CARRYING ELONGATED MEDIA ALONG A VEHICLE FRAME AND A VEHICLE," which is incorporated herein by reference in its entirety.

TECHNICAL FIELD

The disclosure relates generally to assemblies for carrying elongated media. In particular aspects, the disclosure relates to an assembly for carrying elongated media along a vehicle frame, and to a vehicle. The disclosure can be applied to heavy-duty vehicles, such as trucks, buses, and construction equipment, among other vehicle types. Although the disclosure may be described with respect to a particular vehicle, the disclosure is not restricted to any particular vehicle.

BACKGROUND

A vehicle generally comprises cables, pipes, hoses, etc. which are routed in the vehicle. Such elongated media may be routed along a longitudinal direction of a vehicle frame of the vehicle, for example between a front portion and a rear portion of the vehicle frame.

There is a strive to develop improved technology relating to attachment of elongated media to a vehicle frame, such as technology which is reliable, robust, cost-effective, flexible, and/or adaptable to different types of vehicle frames.

SUMMARY

According to a first aspect of the disclosure, an assembly for carrying elongated media along a vehicle frame is provided. The assembly comprises:
- a structurally rigid elongated beam member having a longitudinal extension along a longitudinal direction of the assembly,
- two or more vehicle frame attachment members configured to attach the assembly to the vehicle frame,
- at least one elongated media attachment member configured to attach at least one elongated media to the assembly, and/or an elongated media integrated in the structurally rigid elongated beam member, wherein
the structurally rigid elongated beam member comprises an attachment portion configured to attach the two or more vehicle frame attachment members to the structurally rigid elongated beam member,
each one of the two or more vehicle frame attachment members are configurable to be provided in one of a first attachment state and a second attachment state with respect to the structurally rigid elongated beam member, and
the attachment portion and each one of the two or more vehicle frame attachment members are configured such that, in the first attachment state of the vehicle frame attachment member with respect to the structurally rigid elongated beam member, the vehicle frame attachment member is allowed to slide in the longitudinal direction along at least a section of the longitudinal extension of the structurally rigid elongated beam member. The first aspect of the disclosure may seek to provide an improved and cost-effective assembly for carrying elongated media along a vehicle frame, wherein the assembly carries elongated media in a reliable and robust manner. The first aspect of the disclosure may additionally or alternatively seek to provide an assembly which can be pre-assembled before it is attached to the vehicle frame. A technical benefit may include that, by allowing the vehicle frame attachment member to slide, the mounting of the assembly to the vehicle frame is facilitated. This may also allow the assembly to more easily be mounted to vehicle frames with different dimensions. For example, an infinite number of attachment positions may be provided along the section where the vehicle frame attachment member is allowed to slide. A technical benefit may additionally or alternatively include that the structurally rigid elongated beam member results in a reliable and robust assembly for carrying elongated media, e.g., avoiding any unwanted deflections of the assembly when mounted to the vehicle frame. The use of a structurally rigid elongated beam member may additionally or alternatively facilitate preassembly of the assembly before it is attached to the vehicle frame.

A structurally rigid elongated beam member herein means a beam member which provides structural rigidity to the assembly. For example, the structurally rigid elongated beam member may herein mean a beam member which can carry a load of a specific magnitude without collapsing, in contrast to a flexible elongated member which is not able to carry any load without collapsing. An attachment member being configurable to be provided in one of a first attachment state and a second attachment state with respect to the structurally rigid elongated beam member may herein mean that the attachment member is configured to switch between being provided in the first attachment state or the second attachment state.

Optionally in some examples, including in at least one preferred example, the attachment portion is further configured to attach the at least one elongated media attachment member to the structurally rigid elongated beam member. A technical benefit may include that the attachment portion is also used for attaching the elongated media to the assembly, thereby reducing the need of any other attachment portions on the structurally rigid elongated beam member. This may for example imply a more cost-effective configuration, and/ or a more space-efficient configuration.

Optionally in some examples, including in at least one preferred example, the attachment portion and the at least one elongated media attachment member are configured such that, in a first attachment state of the at least one elongated media attachment member with respect to the structurally rigid elongated beam member, the at least one elongated media attachment member is allowed to slide in the longitudinal direction along at least a section of the longitudinal extension of the structurally rigid elongated beam member. A technical benefit may include that more available attachment positions of the elongated media will be provided along the structurally rigid elongated beam member. For example, an infinite number of attachment positions may be provided along the section where the at least one elongated media attachment member is allowed to slide.

Optionally in some examples, including in at least one preferred example, the attachment portion is a channel and/or a protruding portion with a longitudinal extension along the longitudinal direction. A technical benefit may include that the attachment portion can be easily manufactured, such as by extruding the structurally rigid elongated beam member with an extrusion profile comprising a channel profile and/or a protruding portion profile.

Optionally in some examples, including in at least one preferred example, the channel and/or the protruding portion comprises at least one retaining surface which is configured to retain each one of the two or more vehicle frame attachment members with respect to the channel and/or the protruding portion while the vehicle frame attachment member is allowed to slide in the longitudinal direction along at least the section of the longitudinal extension of the structurally rigid elongated beam member, and/or the at least one retaining surface is configured to retain the at least one elongated media attachment member with respect to the channel and/or the protruding portion while the at least one elongated media attachment member is allowed to slide in the longitudinal direction along at least the section of the longitudinal extension of the structurally rigid elongated beam member. A technical benefit may include that the at least one retaining surface prevents each one of the two or more vehicle frame attachment members and/or the at least one elongated media attachment member from being released from the structurally rigid elongated beam member during the first attachment state. This may imply a facilitated attachment procedure of the assembly to the vehicle frame.

Optionally in some examples, including in at least one preferred example, each one of the two or more vehicle frame attachment members comprises a first retaining member, wherein the first retaining member, in the second attachment state of the vehicle frame attachment member with respect to the structurally rigid elongated beam member, is configured to provide a retaining force between the at least one retaining surface and the vehicle frame attachment member such that the vehicle frame attachment member is prevented from sliding along the longitudinal direction. A technical benefit may include that a reliable and robust attachment of the assembly to the vehicle frame is achieved when the vehicle frame attachment member is in the second attachment state.

Optionally in some examples, including in at least one preferred example, the at least one elongated media attachment member comprises a second retaining member, wherein the second retaining member, in a second attachment state of the at least one elongated media attachment member with respect to the structurally rigid elongated beam member, is configured to provide a retaining force between the at least one retaining surface and the at least one elongated media attachment member such that the at least one elongated media attachment member is prevented from sliding along the longitudinal direction. A technical benefit may include that a reliable and robust attachment of the elongated media to the assembly is achieved when the at least one elongated media attachment member is in the second attachment state.

Optionally in some examples, including in at least one preferred example, the structurally rigid elongated beam member, on an outer periphery thereof, comprises at least one recess which extends in the longitudinal direction and is arranged to receive and support an elongated media such that the elongated media extends in the longitudinal direction along the longitudinal extension of the structurally rigid elongated beam member. A technical benefit may include that the elongated media is reliably attached to the structurally rigid elongated beam member. A technical benefit may additionally or alternatively include that a defined attachment position is provided for the elongated media. By way of example, the elongated media which is received and supported by the at least one recess may be attached to the structurally rigid elongated beam member by use of an auxiliary attachment member, such as a cable tie or the like.

Optionally in some examples, including in at least one preferred example, the at least one recess is at least partly formed by a first surface and a second surface of the outer periphery, wherein the first and second surfaces are inclined away from each other, as seen in a sectional plane which is perpendicular to the longitudinal direction. A technical benefit may include that the at least one recess can receive and support elongated media of different outer diameters.

Optionally in some examples, including in at least one preferred example, the at least one recess is at least partly V-shaped, as seen in a sectional plane which is perpendicular to the longitudinal direction. A technical benefit may include that the at least one recess can receive and support elongated media of different outer diameters.

Optionally in some examples, including in at least one preferred example, the structurally rigid elongated beam member, on the outer periphery thereof, comprises two recesses which extend in the longitudinal direction, each one being arranged to receive and support an elongated media such that the elongated media extends in the longitudinal direction along the longitudinal extension of the structurally rigid elongated beam member. A technical benefit may include that two elongated media are reliably attached to the structurally rigid elongated beam member.

Optionally in some examples, including in at least one preferred example, the two recesses are provided on opposite sides of the outer periphery of the structurally rigid elongated beam member. A technical benefit may include that the weight balance of the assembly may be improved. A technical benefit may additionally or alternatively include more favorable mounting positions for the elongated media, e.g., such that the two elongated media are offset from each other in a manner so that heat conduction therebetween is mitigated.

Optionally in some examples, including in at least one preferred example, at least one of the two or more vehicle frame attachment members comprises a first arm member via which the vehicle frame attachment member is configured to attach the assembly to the vehicle frame, wherein the first arm member extends from the structurally rigid elongated beam member such that the first arm member and the structurally rigid elongated beam member form a receiving space therebetween for receiving an elongated media. A technical benefit may include an improved and more reliable attachment of the elongated media to the assembly.

Optionally in some examples, including in at least one preferred example, the structurally rigid elongated beam member has a uniform profile along at least the section at which the vehicle frame attachment member and/or the at least one elongated media attachment member is/are allowed to slide, as seen in sectional planes which are perpendicular to the longitudinal direction. A technical benefit may include that a more favorable and cost-effective profile is achieved, e.g., allowing the structurally rigid elongated beam member to be produced by extrusion.

Optionally in some examples, including in at least one preferred example, the structurally rigid elongated beam member comprises or consists of one or more of the following: polymer, such as fiber reinforced polymer; metal, such as steel, aluminum or copper. A technical benefit may include that a reliable and robust structurally rigid elongated beam member can be provided in a cost-effective manner.

Optionally in some examples, including in at least one preferred example, the assembly further comprises at least one elongated media attached to the assembly by the at least one elongated media attachment member and/or at least one elongated media received in the at least one recess according to any one of the examples disclosed herein.

Optionally in some examples, including in at least one preferred example, the at least one elongated media received in the at least one recess has a circular or oval outer perimeter profile, as seen in a sectional plane which is perpendicular to the longitudinal direction. A technical benefit may include that the circular or oval outer perimeter profile may have different outer diameters and still be reliably attached to the structurally rigid elongated beam member.

Optionally in some examples, including in at least one preferred example, the at least one elongated media received in the at least one recess is a conduit for transporting a fluid, such as for transporting a coolant fluid, compressed air, HVAC gases, and/or fuel. A technical benefit may include that the conduit for transporting a fluid is reliably and robustly attached to the structurally rigid elongated media. By way of example, the conduit for transporting a fluid may be a pipe or a hose.

According to a second aspect of the disclosure, a vehicle comprising a vehicle frame which extends along a longitudinal direction of the vehicle is provided. The vehicle frame comprises:

a first and a second rail member which are offset from each other in a transverse direction of the vehicle and which extend in the longitudinal direction between a front portion and a rear portion of the vehicle, at least two crossbeams which extend in the transverse direction, connecting the first and second rail members together, wherein the at least two crossbeams are offset from each other in the longitudinal direction, wherein the vehicle further comprises an assembly according to any one of the examples of the first aspect of the disclosure, wherein the longitudinal direction of the assembly corresponds to the longitudinal direction of the vehicle and wherein one of the two or more vehicle frame attachment members is attached to one of the at least two crossbeams and another one of the two or more vehicle frame attachment members is attached to another one of the at least two crossbeams. The second aspect of the disclosure may seek to provide an improved and cost-effective assembly for carrying elongated media along the vehicle frame, wherein the assembly carries elongated media in a reliable and robust manner. A technical benefit may include that, by allowing the vehicle frame attachment member to slide, the mounting of the assembly to the crossbeams is facilitated. This may also allow the assembly to more easily be mounted to vehicle frames with different dimensions, e.g., with different distances between the crossbeams. For example, an infinite number of attachment positions may be provided along the section where the vehicle frame attachment member is allowed to slide. A technical benefit may additionally or alternatively include that the structurally rigid elongated beam member results in a reliable and robust assembly for carrying elongated media, e.g., avoiding any unwanted deflections of the assembly when mounted to the vehicle frame. Advantages and benefits of the second aspect of the disclosure are analogous to the advantages and benefits of the first aspect of the disclosure.

Optionally in some examples, including in at least one preferred example, the assembly is located below the at least two crossbeams, as seen in a height direction of the vehicle, and preferably midway between the first and second rail members, as seen in the transverse direction. A technical benefit may include that a more favorable mounting position for the elongated media is achieved. By way of example, if the vehicle is an electric vehicle, the elongated media may be mounted in this position instead of e.g. drive shafts etc. which are used for vehicles having a combustion engine.

The disclosed aspects, examples (including any preferred examples), and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

BRIEF DESCRIPTION OF THE DRAWINGS

Examples are described in more detail below with reference to the appended drawings.

FIG. 6 is an exemplary vehicle frame and assembly in a perspective view according to an example.

Figure 1:
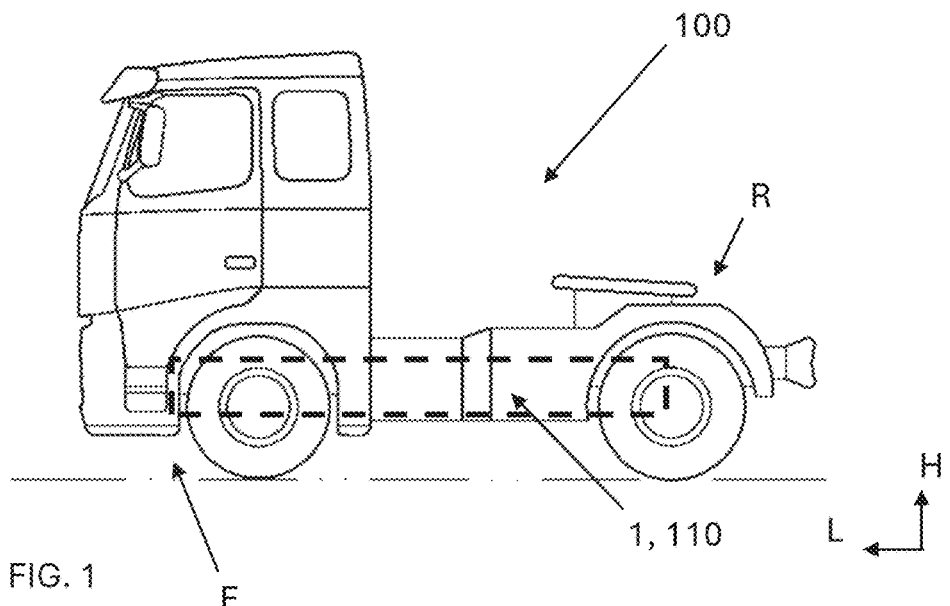
FIG. 1 is an exemplary vehicle in a side view according to an example.

The drawings are not necessarily drawn to scale. It shall also be noted that some details in the drawings may be exaggerated in order to better describe and illustrate the particular example. Like reference characters refer to like elements throughout the description, unless expressed otherwise. Some reference characters in some of the drawings may have been omitted for the sake of clarity.

DETAILED DESCRIPTION

The detailed description set forth below provides information and examples of the disclosed technology with sufficient detail to enable those skilled in the art to practice the disclosure.

An aim of the present disclosure is to provide an improved assembly for carrying elongated media along a vehicle frame. For example, by the present disclosure, a reliable, robust and cost-effective assembly may be achieved in which the assembly is easily mounted to the vehicle frame, e.g., allowing the assembly to be mounted to vehicle frames with different dimensions. An aim of the present disclosure is further to provide an improved assembly for carrying elongated media along a vehicle frame, and/or a vehicle, which at least partly alleviates one or more drawbacks of the prior art, or which provides suitable alternatives. For example, the assembly as disclosed herein may be pre-assembled before it is mounted to the vehicle frame.

FIG. 1 is an exemplary vehicle 100 in a side view according to an example. The vehicle 100 is a truck for towing one or more trailers (not shown). It shall however be understood that the vehicle may be any other type of vehicle, such as another type of truck, a bus, a passenger car, and construction equipment, such as an excavator, a wheel loader, etc. The vehicle 100 may be driven by a user (not shown) and/or be at least partly automatically driven, i.e., it may be a vehicle comprising autonomous driving capabilities. The vehicle 100 may be a fully electric vehicle, a hybrid vehicle, or a vehicle without any electric propulsion means. As such, the vehicle 100 may comprise one or more electric motors/generators and/or an internal combustion engine (not shown) for driving the vehicle 100.

The vehicle 100 comprises a vehicle frame 110 and an assembly 1 as disclosed herein. The vehicle frame 110 extends along a longitudinal direction L of the vehicle L, which herein corresponds to a longitudinal direction L of the assembly 1. The vehicle frame 110 extends in the longitudinal direction L between a front portion F and a rear portion R of the vehicle 100.

Figure 2:
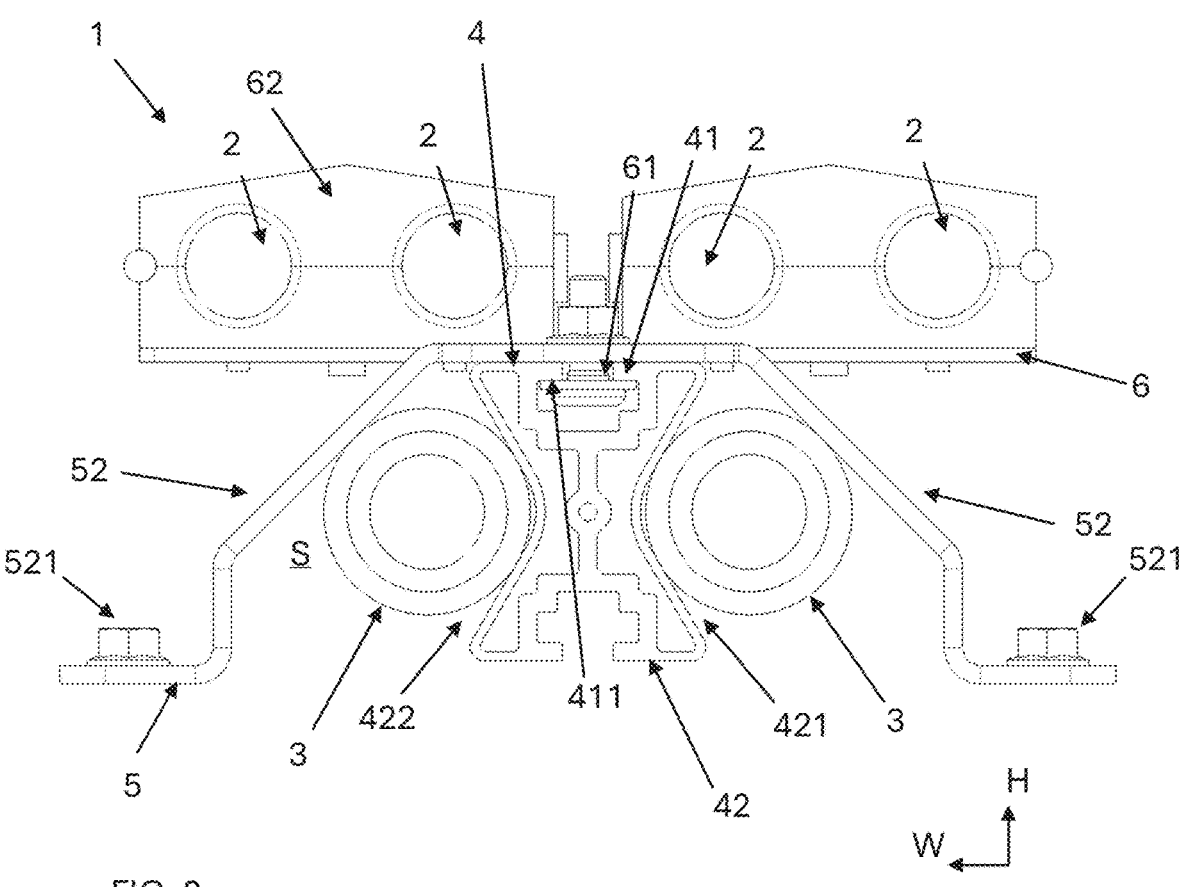
FIG. 2 is an exemplary assembly in a sectional view according to an example.

FIG. 2 is an exemplary assembly 1 for carrying elongated media 2, 3 along a vehicle frame 110 in a sectional view according to an example. The sectional view is perpendicular to the longitudinal direction L of the assembly 1. The vehicle frame 110 and the assembly 1 may for example be the vehicle frame 110 and assembly 1 shown in FIG. 1. A transverse direction W and a height direction H are also depicted in FIG. 2. The directions L, W, and H are perpendicular to each other, e.g., corresponding to a Cartesian coordinate system.

The assembly 1 comprises a structurally rigid elongated beam member 4 which has a longitudinal extension along the longitudinal direction L of the assembly 1. The assembly 1 further comprises two or more vehicle frame attachment members 5, 5', 5" configured to attach the assembly 1 to the vehicle frame 110. In FIG. 2, one of the two or more vehicle frame attachment members 5, 5', 5" is depicted.

The assembly 1 further comprises at least one elongated media attachment member 6, 6', 6", 6''' configured to attach at least one elongated media 2 to the assembly 1. Additionally or alternatively, an elongated media (not shown) may be integrated in the structurally rigid elongated beam member 4.

The structurally rigid elongated beam member 4 comprises an attachment portion 41 configured to attach the two or more vehicle frame attachment members 5, 5', 5" to the structurally rigid elongated beam member 4. Each one of the two or more vehicle frame attachment members 5, 5', 5" are configurable to be provided in one of a first attachment state and a second attachment state with respect to the structurally rigid elongated beam member 4. In addition, the attachment portion 41 and each one of the two or more vehicle frame attachment members 5, 5', 5" are configured such that, in the first attachment state of the vehicle frame attachment member 5, 5', 5" with respect to the structurally rigid elongated beam member 4, the vehicle frame attachment member 5, 5', 5" is allowed to slide in the longitudinal direction L along at least a section of the longitudinal extension of the structurally rigid elongated beam member 4. In the example shown in FIG. 2, this is at least partly achieved in that the attachment portion 41 is a channel with a longitudinal extension along the longitudinal direction L.

The elongated media 2 is, in the example shown in FIG. 2, an electric cable. More specifically, the at least one elongated media attachment member 6 is in the example shown configured to carry four electric cables 2. It shall however be noted that more or fewer elongated media may be carried by the at least one elongated media attachment member. As shown in FIG. 2, the at least one elongated media attachment member 6 may comprise a holder 62 for holding the one or more elongated media 2.

The elongated media 3 is in the example shown in FIG. 2 a respective conduit for transporting a fluid. More specifically, in this example, the elongated media 3 is a pipe for transporting a coolant. It shall however be noted that other types of elongated media may additionally or alternatively be used.

As shown in FIG. 2, the attachment portion 41 may further be configured to attach the at least one elongated media attachment member 6, 6', 6", 6''' to the structurally rigid elongated beam member 4.

As further shown in FIG. 2, the attachment portion 41 and the at least one elongated media attachment member 6, 6', 6", 6''' may be configured such that, in a first attachment state of the at least one elongated media attachment member 6, 6', 6", 6''' with respect to the structurally rigid elongated beam member 4, the at least one elongated media attachment member 6, 6', 6", 6''' is allowed to slide in the longitudinal direction L along at least a section of the longitudinal extension of the structurally rigid elongated beam member 4. Accordingly, in the example shown in FIG. 2, this is at least partly achieved in that the attachment portion 41 is a channel with a longitudinal extension along the longitudinal direction L.

Figure 3A:
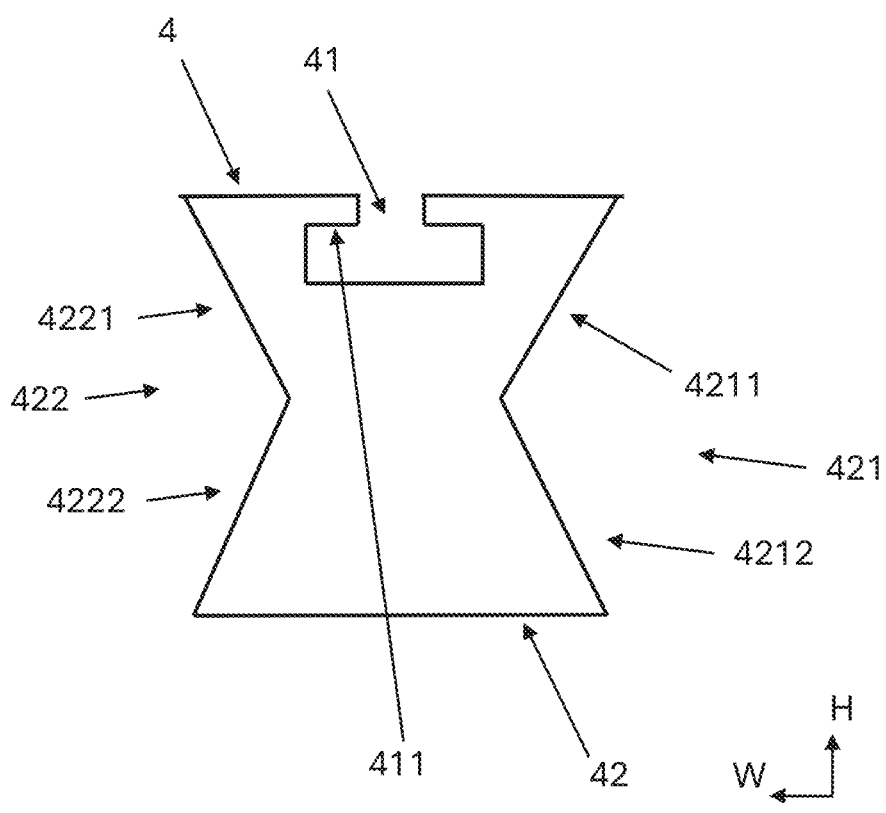
FIGS. 3A-3B are exemplary structurally rigid elongated beam members in sectional views according to examples.
Figure 3B:
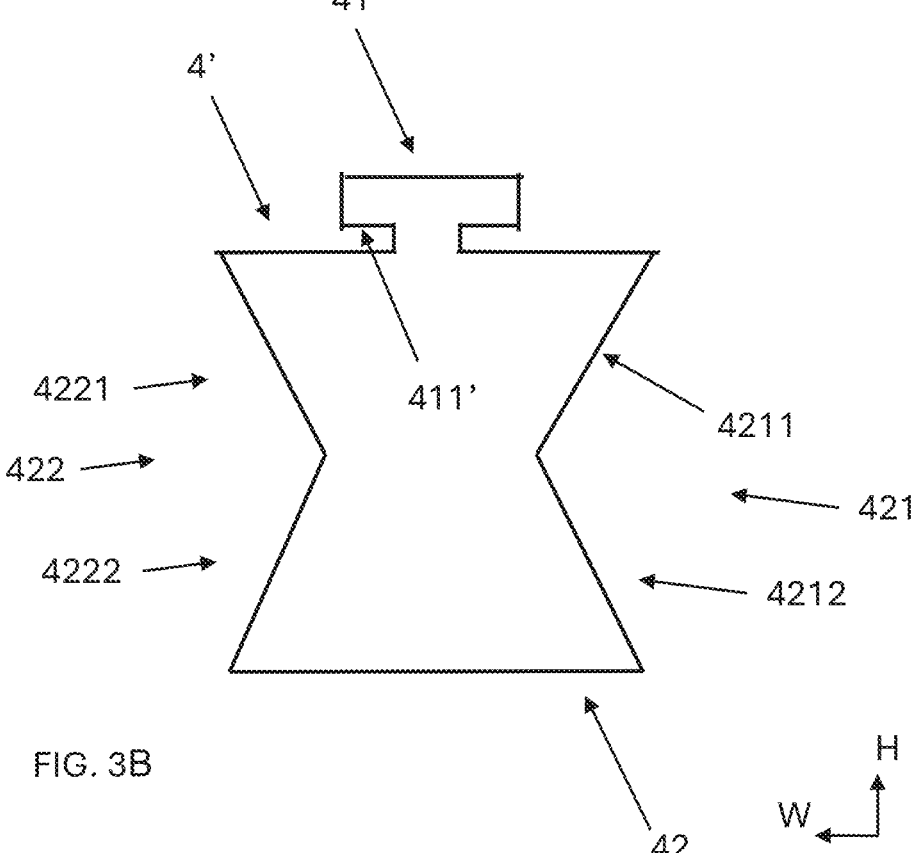

FIGS. 3A-3B show two example configurations of a structurally rigid elongated beam member 4, 4' according to examples. The examples depict sectional views of the structurally rigid elongated beam members 4, 4', as seen in a plane which is perpendicular to the longitudinal direction L. In FIG. 3A, the attachment portion 41 is a channel, as also depicted in e.g. FIG. 2. In FIG. 3B, the attachment portion 41' is a protruding portion with a longitudinal extension along the longitudinal direction L. In the examples shown, perimeter profiles of the channel 41 and the protruding portion 41' are similar. The perimeter profiles may by way of example be T-formed, or "mushroom"-formed.

The channel 41 and/or the protruding portion 41' may comprise at least one retaining surface 411, 411' which is configured to retain each one of the two or more vehicle frame attachment members 5, 5', 5" with respect to the channel 41 and/or the protruding portion 41' while the vehicle frame attachment member 5, 5', 5" is allowed to slide in the longitudinal direction L along at least the section of the longitudinal extension of the structurally rigid elongated beam member 4, 4'. In the examples shown in FIGS. 3A-3B, the retaining surfaces 411, 411' are part of the respective perimeter profile.

Additionally or alternatively, the at least one retaining surface 411, 411' may be configured to retain the at least one elongated media attachment member 6, 6', 6", 6''' with respect to the channel 41 and/or the protruding portion 41' while the at least one elongated media attachment member 6, 6', 6", 6''' is allowed to slide in the longitudinal direction L along at least the section of the longitudinal extension of the structurally rigid elongated beam member 4.

Figure 4:
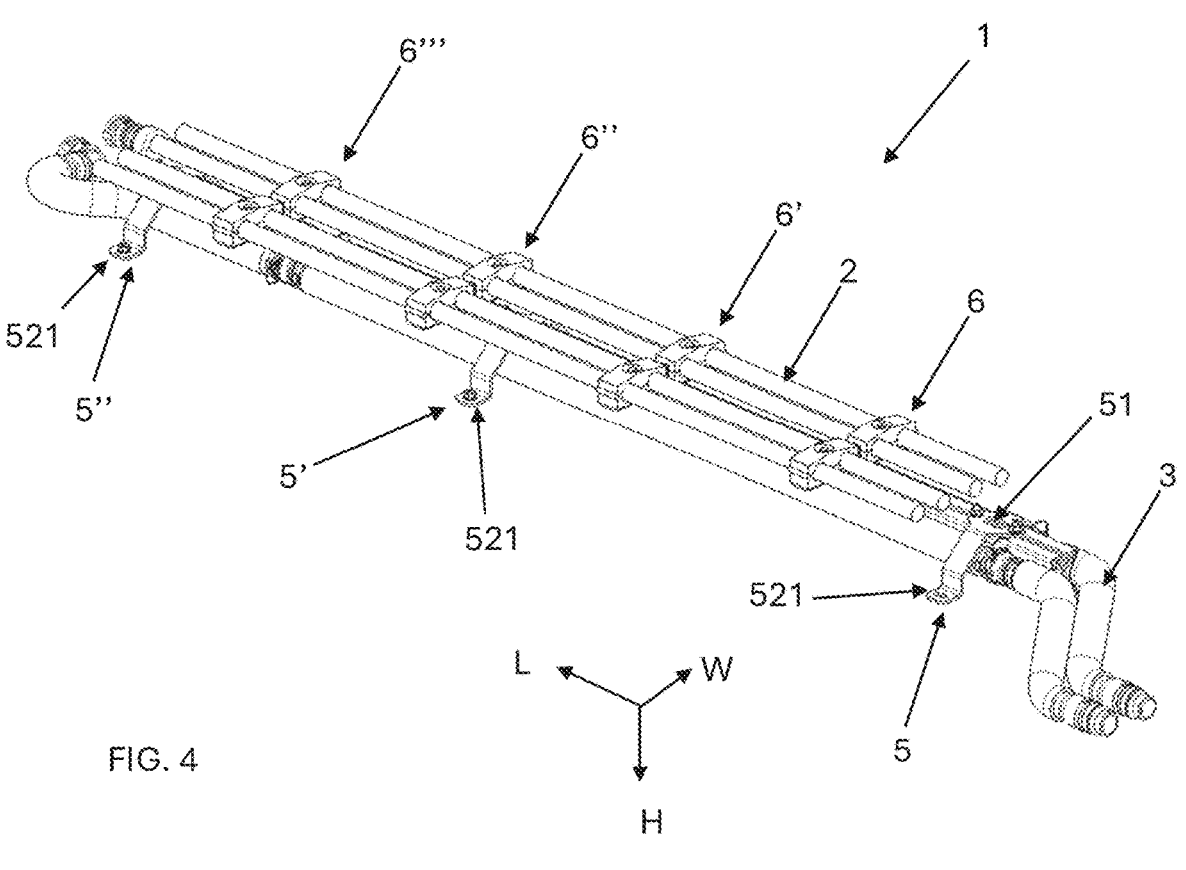
FIG. 4 is an exemplary assembly in a perspective view according to an example.

FIG. 4 depicts an exemplary assembly 1 in a perspective view according to an example. The assembly in FIG. 4 may for example be the assembly 1 as shown in FIG. 2. In the shown example, the assembly 1 comprises three vehicle frame attachment members 5, 5', 5" and four elongated media attachment members 6, 6', 6", 6'''. It shall be noted that more or fewer such members may be used.

Each one of the two or more vehicle frame attachment members 5, 5', 5" may as shown comprise a first retaining member 51 (only one of them is shown in FIG. 4), wherein the first retaining member 51, in the second attachment state of the vehicle frame attachment member 5, 5', 5" with respect to the structurally rigid elongated beam member 4, is configured to provide a retaining force between the at least one retaining surface 411 and the vehicle frame attachment member 5, 5', 5" such that the vehicle frame attachment member 5, 5', 5" is prevented from sliding along the longitudinal direction L. The first retaining member 51 may be a fastener, such as a screw/nut assembly or the like. A transition between the first and second attachment states of the respective vehicle frame attachment member 5, 5', 5" may be achieved by tightening or releasing the first retaining member 51.

In a similar manner, as depicted in FIG. 2, the at least one elongated media attachment member 6, 6', 6", 6'" may comprise a second retaining member 61, wherein the second retaining member 61, in a second attachment state of the at least one elongated media attachment member 6, 6', 6", 6'" with respect to the structurally rigid elongated beam member 4, is configured to provide a retaining force between the at least one retaining surface 411 and the at least one elongated media attachment member 6, 6', 6", 6'" such that the at least one elongated media attachment member 6, 6', 6", 6'" is prevented from sliding along the longitudinal direction L. The second retaining member 61 may be a fastener, such as a screw/nut assembly or the like. A transition between the first and second attachment states of the respective elongated media attachment member 6, 6', 6", 6'" may be achieved by tightening or releasing the second retaining member 61.

Accordingly, by way of example, the first retaining member 51 and/or the second retaining member 61 may be configured to be tightened such that it is immovably fixed to the attachment portion 41 and released such that it can slide in the attachment portion 41 along the longitudinal direction L, i.e., thereby switching between the first and second attachment states of the respective vehicle frame attachment member 5, 5', 5" and/or of the respective elongated media attachment member 6, 6', 6", 6'". For example, this may be achieved by tightening/releasing a screw/nut assembly or by tightening/releasing any other assembly which is configured to switch between a tightened state and a released state in this manner.

As shown in e.g. FIGS. 2 and 3A-3B, the structurally rigid elongated beam member 4, on an outer periphery 42 thereof, may comprise at least one recess 421, 422 which extends in the longitudinal direction L and is arranged to receive and support an elongated media 3 such that the elongated media 3 extends in the longitudinal direction L along the longitudinal extension of the structurally rigid elongated beam member 4. In the shown examples, the structurally rigid elongated beam member 4, on the outer periphery 42 thereof, comprises two recesses 421, 422 which extend in the longitudinal direction L, each one being arranged to receive and support an elongated media 3 such that the elongated media 3 extends in the longitudinal direction L along the longitudinal extension of the structurally rigid elongated beam member 4.

The elongated media 3 provided in the at least one recess 421, 422 may be attached to the structurally rigid elongated beam member 4 by at least one cable tie (not shown) provided around the elongated media 3 and the structurally rigid elongated beam member 4.

The at least one recess 421, 422 may as shown be at least partly formed by a first surface 4211; 4221 and a second surface 4212; 4222 of the outer periphery 42, wherein the first and second surfaces 4211, 4212; 4221, 4222 are inclined away from each other, as seen in a sectional plane which is perpendicular to the longitudinal direction L. In the shown examples, the at least one recess 421, 422 is at least partly V-shaped, as seen in a sectional plane which is perpendicular to the longitudinal direction L.

The two recesses 421, 422 may be provided on opposite sides of the outer periphery 42 of the structurally rigid elongated beam member 4, such as shown on opposite lateral sides of the outer periphery 42.

As shown in e.g. FIG. 2, at least one of the two or more vehicle frame attachment members 5, 5', 5" may comprise a first arm member 52 via which the vehicle frame attachment member 5, 5', 5" is configured to attach the assembly 1 to the vehicle frame 110, wherein the first arm member 52 extends from the structurally rigid elongated beam member 4 such that the first arm member 52 and the structurally rigid elongated beam member 4 form a receiving space S therebetween for receiving an elongated media 3. In the shown example, the first arm member 52 is inclined away from the structurally rigid elongated beam member 4.

The two or more vehicle frame attachment members 5, 5', 5" may be attached to the vehicle frame 110 by a fastener 521, such as a screw or the like.

As further shown in e.g. FIG. 2, the vehicle frame attachment member 5, 5', 5" may comprise a first and a second arm member 52. The first and second arm members 52 may as shown be provided on opposite lateral sides of the structurally rigid elongated beam member 4. The first and the second arm members 52 may be similarly configured, and mirrored with respect to the structurally rigid elongated beam member 4.

The structurally rigid elongated beam member 4 may have a uniform profile along at least the section at which the vehicle frame attachment member 5, 5', 5" and/or the at least one elongated media attachment member 6, 6', 6", 6'" is/are allowed to slide, as seen in sectional planes which are perpendicular to the longitudinal direction L.

The structurally rigid elongated beam member 4 may comprise or consist of one or more of the following: polymer, such as fiber reinforced polymer; metal, such as steel, aluminum or copper. By way of example, the structurally rigid elongated beam member 4 may be an extruded profile. As another example, the structurally rigid elongated beam member 4 may be a cast/molded profile.

The at least one elongated media 3 received in the at least one recess 421, 422 may as shown have a circular or oval outer perimeter profile, as seen in a sectional plane which is perpendicular to the longitudinal direction L.

Figure 5:
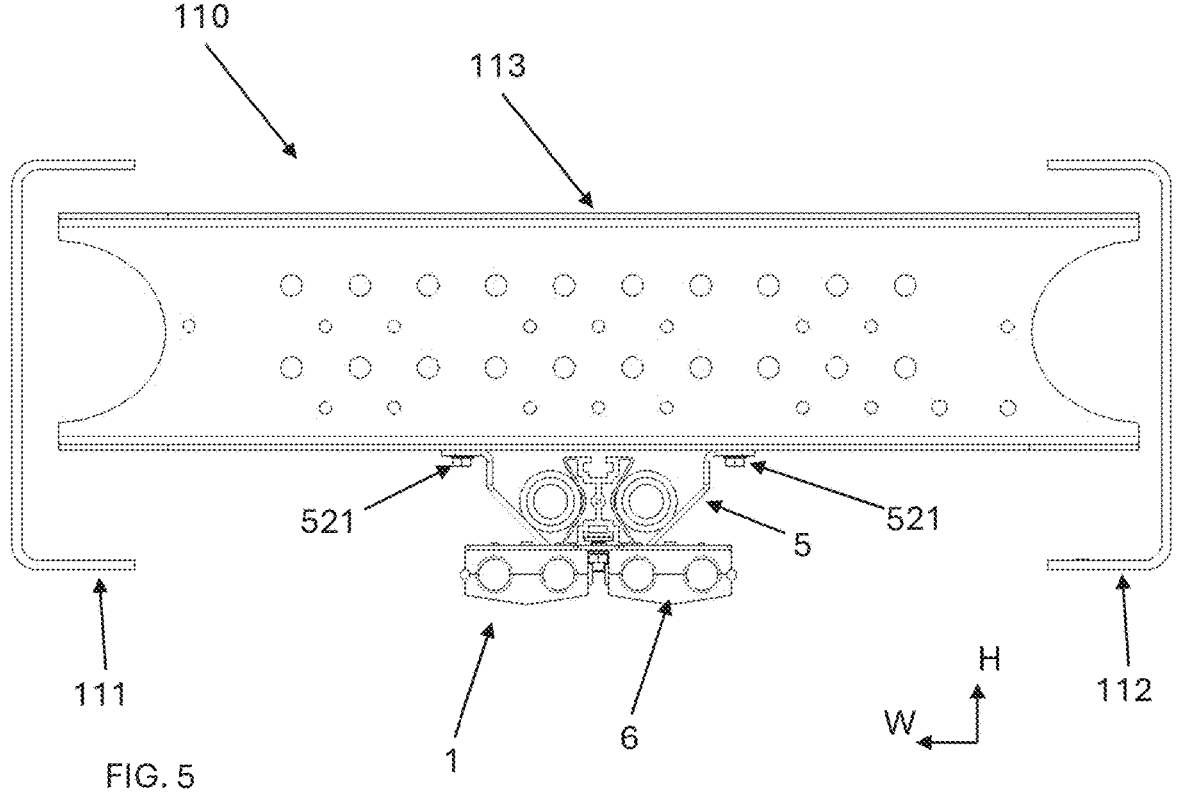
FIG. 5 is an exemplary vehicle frame and assembly in a sectional view according to an example.

FIG. 5 is an exemplary vehicle frame 110 and assembly 1 in a sectional view according to an example. The assembly 1 may for example be the assembly as shown in any one of FIGS. 2-4. FIG. 6 is an exemplary vehicle frame 110 and assembly 1 in a perspective view according to an example. The vehicle frame 110 and the assembly 1 in FIG. 6 may for example be the vehicle frame 110 and the assembly 1 shown in FIG. 5.

The vehicle frame 110 extends along a longitudinal direction L of the vehicle 100, e.g. the vehicle 100 shown in FIG. 1.

The vehicle frame 110 comprises a first and a second rail member 111, 112 which are offset from each other in the transverse direction W of the vehicle 100 and which extend in the longitudinal direction L between the front portion F and the rear portion R of the vehicle 100.

The vehicle frame 110 further comprises at least two crossbeams 113, 114, 115 which extend in the transverse direction W, connecting the first and second rail members 111, 112 together. The at least two crossbeams 113, 114, 115 are offset from each other in the longitudinal direction L. In the example shown in FIG. 6, three crossbeams 113, 114, 115 are depicted.

The vehicle 100 further comprises an assembly 1 according to any one of the examples disclosed herein, wherein the longitudinal direction L of the assembly 1 corresponds to the longitudinal direction L of the vehicle 100 and wherein one of the two or more vehicle frame attachment members 5, 5', 5" is attached to one of the at least two crossbeams 113, 114, 115 and another one of the two or more vehicle frame attachment members 5, 5', 5" is attached to another one of the at least two crossbeams 113, 114, 115. Accordingly, the two or more vehicle frame attachment members 5, 5', 5" are offset from each other in the longitudinal direction L.

In the examples depicted in FIGS. 5 and 6, the assembly 1 is located below the at least two crossbeams 113, 114, 115, as seen in a height direction H of the vehicle 100, and also midway between the first and second rail members 111, 112, as seen in the transverse direction W.

Figure 7:
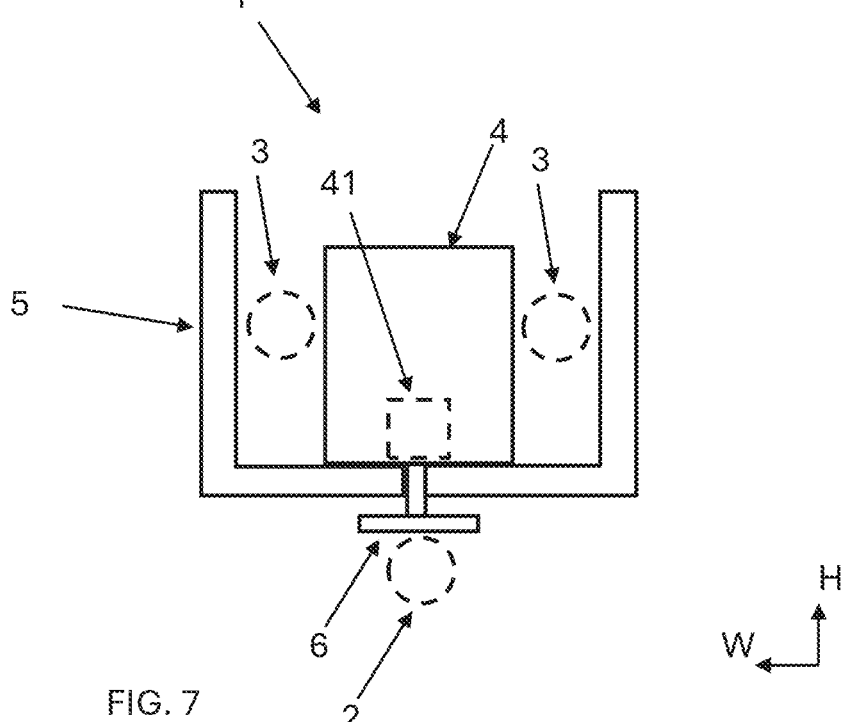
FIG. 7 is another view of FIG. 2, according to an example.

FIG. 7 is another view of FIG. 2, according to an example. An assembly 1 for carrying elongated media 2, 3 along a vehicle frame 110 is depicted. The assembly 1 comprising:

a structurally rigid elongated beam member 4 having a longitudinal extension along a longitudinal direction L of the assembly 1, two or more vehicle frame attachment members 5, 5', 5" configured to attach the assembly 1 to the vehicle frame 110, at least one elongated media attachment member 6, 6', 6", 6'" configured to attach at least one elongated media 2 to the assembly 1, and/or an elongated media integrated in the structurally rigid elongated beam member 4, wherein the structurally rigid elongated beam member 4 comprises an attachment portion 41 configured to attach the two or more vehicle frame attachment members 5, 5', 5" to the structurally rigid elongated beam member 4, each one of the two or more vehicle frame attachment members 5, 5', 5" are configurable to be provided in one of a first attachment state and a second attachment state with respect to the structurally rigid elongated beam member 4, and the attachment portion 41 and each one of the two or more vehicle frame attachment members 5, 5', 5" are configured such that, in the first attachment state of the vehicle frame attachment member 5, 5', 5" with respect to the structurally rigid elongated beam member 4, the vehicle frame attachment member 5, 5', 5' is allowed to slide in the longitudinal direction L along at least a section of the longitudinal extension of the structurally rigid elongated beam member 4.

In the below, possible features and feature combinations of the present disclosure are presented as a list or Examples.

Example 1: An assembly (1) for carrying elongated media (2, 3) along a vehicle frame (110), the assembly (1) comprising:

a structurally rigid elongated beam member (4) having a longitudinal extension along a longitudinal direction (L) of the assembly (1), two or more vehicle frame attachment members (5, 5', 5") configured to attach the assembly (1) to the vehicle frame (110), at least one elongated media attachment member (6, 6', 6", 6'") configured to attach at least one elongated media (2) to the assembly (1), and/or an elongated media integrated in the structurally rigid elongated beam member (4), wherein the structurally rigid elongated beam member (4) comprises an attachment portion (41) configured to attach the two or more vehicle frame attachment members (5, 5', 5") to the structurally rigid elongated beam member (4), each one of the two or more vehicle frame attachment members (5, 5', 5") are configurable to be provided in one of a first attachment state and a second attachment state with respect to the structurally rigid elongated beam member (4), and the attachment portion (41) and each one of the two or more vehicle frame attachment members (5, 5', 5") are configured such that, in the first attachment state of the vehicle frame attachment member (5, 5', 5") with respect to the structurally rigid elongated beam member (4), the vehicle frame attachment member (5, 5', 5") is allowed to slide in the longitudinal direction (L) along at least a section of the longitudinal extension of the structurally rigid elongated beam member (4).

Example 2: The assembly (1) according to Example 1, wherein the attachment portion (41) is further configured to attach the at least one elongated media attachment member (6, 6', 6", 6'") to the structurally rigid elongated beam member (4).

Example 3: The assembly (1) according to Example 2, wherein the attachment portion (41) and the at least one elongated media attachment member (6, 6', 6", 6'") are configured such that, in a first attachment state of the at least one elongated media attachment member (6, 6', 6", 6'") with respect to the structurally rigid elongated beam member (4), the at least one elongated media attachment member (6, 6', 6", 6'") is allowed to slide in the longitudinal direction (L) along at least a section of the longitudinal extension of the structurally rigid elongated beam member (4).

Example 4: The assembly (1) according to any one of the preceding Examples, wherein the attachment portion (41) is a channel and/or a protruding portion with a longitudinal extension along the longitudinal direction (L).

Example 5: The assembly (1) according to Example 4, wherein the channel and/or the protruding portion comprises at least one retaining surface (411, 411') which is configured to retain each one of the two or more vehicle frame attachment members (5, 5', 5") with respect to the channel and/or the protruding portion while the vehicle frame attachment member (5, 5', 5") is allowed to slide in the longitudinal direction (L) along at least the section of the longitudinal extension of the structurally rigid elongated beam member (4), and/or the at least one retaining surface (411, 411') is configured to retain the at least one elongated media attachment member (6, 6', 6", 6'") with respect to the channel and/or the protruding portion while the at least one elongated media attachment member (6, 6', 6", 6'") is allowed to slide in the longitudinal direction (L) along at least the section of the longitudinal extension of the structurally rigid elongated beam member (4).

Example 6: The assembly (1) according to Example 5, wherein each one of the two or more vehicle frame attachment members (5, 5', 5") comprises a first retaining member (51), wherein the first retaining member (51), in the second attachment state of the vehicle frame attachment member (5, 5', 5") with respect to the structurally rigid elongated beam member (4), is configured to provide a retaining force between the at least one retaining surface (411) and the vehicle frame attachment member (5, 5', 5") such that the vehicle frame attachment member (5, 5', 5") is prevented from sliding along the longitudinal direction (L).

Example 7: The assembly (1) according to any one of Examples 5-6, wherein the at least one elongated media attachment member (6, 6', 6", 6'") comprises a second retaining member (61), wherein the second retaining member (61), in a second attachment state of the at least one elongated media attachment member (6, 6', 6", 6'") with respect to the structurally rigid elongated beam member (4), is configured to provide a retaining force between the at least one retaining surface (411) and the at least one elongated media attachment member (6, 6', 6", 6''') such that the at least one elongated media attachment member (6, 6', 6", 6''') is prevented from sliding along the longitudinal direction (L).

Example 8: The assembly (1) according to any one of the preceding Examples, wherein the structurally rigid elongated beam member (4), on an outer periphery (42) thereof, comprises at least one recess (421, 422) which extends in the longitudinal direction (L) and is arranged to receive and support an elongated media (3) such that the elongated media (3) extends in the longitudinal direction (L) along the longitudinal extension of the structurally rigid elongated beam member (4).

Example 9: The assembly (1) according to Example 8, wherein the at least one recess (421, 422) is at least partly formed by a first surface (4211; 4221) and a second surface (4212; 4222) of the outer periphery (42), wherein the first and second surfaces (4211, 4212; 4221, 4222) are inclined away from each other, as seen in a sectional plane which is perpendicular to the longitudinal direction (L).

Example 10: The assembly (1) according to any one of Examples 8 or 9, wherein the at least one recess (421, 422) is at least partly V-shaped, as seen in a sectional plane which is perpendicular to the longitudinal direction (L).

Example 11: The assembly (1) according to any one of Examples 8-10, wherein the structurally rigid elongated beam member (4), on the outer periphery (42) thereof, comprises two recesses (421, 422) which extend in the longitudinal direction (L), each one being arranged to receive and support an elongated media (3) such that the elongated media (3) extends in the longitudinal direction (L) along the longitudinal extension of the structurally rigid elongated beam member (4).

Example 12: The assembly (1) according to Example 11, wherein the two recesses (421, 422) are provided on opposite sides of the outer periphery (42) of the structurally rigid elongated beam member (4).

Example 13: The assembly (1) according to any one of the preceding Examples, wherein at least one of the two or more vehicle frame attachment members (5, 5', 5") comprises a first arm member (52) via which the vehicle frame attachment member (5, 5', 5") is configured to attach the assembly (1) to the vehicle frame (110), wherein the first arm member (52) extends from the structurally rigid elongated beam member (4) such that the first arm member (52) and the structurally rigid elongated beam member (4) form a receiving space (S) therebetween for receiving an elongated media (3).

Example 14: The assembly (1) according to any one of the preceding Examples, wherein the structurally rigid elongated beam member (4) has a uniform profile along at least the section at which the vehicle frame attachment member (5, 5', 5") and/or the at least one elongated media attachment member (6, 6', 6", 6''') is/are allowed to slide, as seen in sectional planes which are perpendicular to the longitudinal direction (L).

Example 15: The assembly (1) according to any one of the preceding Examples, wherein the structurally rigid elongated beam member (4) comprises or consists of one or more of the following: polymer, such as fiber reinforced polymer; metal, such as steel, aluminum or copper.

Example 16: The assembly (1) according to any one of the preceding Examples, further comprising at least one elongated media (2) attached to the assembly (1) by the at least one elongated media attachment member (6, 6', 6", 6''')

and/or at least one elongated media (3) received in the at least one recess (421, 422) according to any one of claims 8-12.

Example 17: The assembly (1) according to Example 16, wherein the at least one elongated media (3) received in the at least one recess (421, 422) has a circular or oval outer perimeter profile, as seen in a sectional plane which is perpendicular to the longitudinal direction (L).

Example 18: The assembly (1) according to Example 17, wherein the at least one elongated media (3) received in the at least one recess (421, 422) is a conduit for transporting a fluid, such as for transporting a coolant fluid, compressed air, HVAC gases, and/or fuel.

Example 19: A vehicle (100) comprising a vehicle frame (110) which extends along a longitudinal direction (L) of the vehicle (100), wherein the vehicle frame (110) comprises:

a first and a second rail member (111, 112) which are offset from each other in a transverse direction (W) of the vehicle (100) and which extend in the longitudinal direction (L) between a front portion (F) and a rear portion (R) of the vehicle (100), at least two crossbeams (113, 114, 115) which extend in the transverse direction (W), connecting the first and second rail members (111, 112) together, wherein the at least two crossbeams (113, 114, 115) are offset from each other in the longitudinal direction (L), wherein the vehicle (100) further comprises an assembly (1) according to any one of the preceding Examples, wherein the longitudinal direction (L) of the assembly (1) corresponds to the longitudinal direction (L) of the vehicle (100) and wherein one of the two or more vehicle frame attachment members (5, 5', 5") is attached to one of the at least two crossbeams (113, 114, 115) and another one of the two or more vehicle frame attachment members (5, 5', 5") is attached to another one of the at least two crossbeams (113, 114, 115).

Example 20: The vehicle (100) according to Example 19, wherein the assembly (1) is located below the at least two crossbeams (113, 114, 115), as seen in a height direction (H) of the vehicle (100), and preferably midway between the first and second rail members (111, 112), as seen in the transverse direction (W).

The terminology used herein is for the purpose of describing particular aspects only and is not intended to be limiting of the disclosure. As used herein, the singular forms "a", "an", and "the" are intended to include the plural forms as well, unless the context clearly indicates otherwise. As used herein, the term "and/or" includes any and all combinations of one or more of the associated listed items. It will be further understood that the terms "comprises", "comprising", "includes", and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

What is claimed is:

1. An assembly for carrying elongated media along a vehicle frame, the assembly comprising:
   a structurally rigid elongated beam having a longitudinal extension along a longitudinal direction, the structurally rigid elongated beam being at least one of attached to elongated media or configured to be attached to the elongated media;
   two or more vehicle frame attachments configured to attach the structurally rigid elongated beam to a vehicle frame;
   wherein each of the two or more vehicle frame attachments are configurable to be provided in;
      a first attachment state in which a respective vehicle frame attachment of the two or more vehicle frame attachments is allowed to slide in the longitudinal direction along at least a section of the longitudinal extension of the structurally rigid elongated beam; and
      a second attachment state in which the respective vehicle frame attachment is prevented from sliding in the longitudinal direction along at least a section of the longitudinal extension of the structurally rigid elongated beam.

2. The assembly of claim 1, wherein the structurally rigid elongated beam further comprises a beam attachment configured to attach to at least one elongated media attachment, the at least one elongated media attachment configured to attach to the elongated media.

3. The assembly of claim 2, wherein the beam attachment and the at least one elongated media attachment are configured such that, in a first attachment state of the at least one elongated media attachment with respect to the structurally rigid elongated beam, the at least one elongated media attachment is allowed to slide in the longitudinal direction along at least a section of the longitudinal extension of the structurally rigid elongated beam.

4. The assembly of claim 3, wherein the attachment is at least one of a channel and a protrusion with a longitudinal extension along the longitudinal direction, wherein the at least one of the channel and the protrusion comprises at least one retaining surface which is configured to retain the at least one elongated media attachment with respect to the at least one of the channel and the protrusion while the at least one elongated media attachment is allowed to slide in the longitudinal direction along at least the section of the longitudinal extension of the structurally rigid elongated beam.

5. The assembly of claim 4, wherein the at least one elongated media attachment comprises a second retainer, wherein the second retainer, in a second attachment state of the at least one elongated media attachment with respect to the structurally rigid elongated beam, is configured to provide a retaining force between the at least one retaining surface and the at least one elongated media attachment such that the at least one elongated media attachment is prevented from sliding along the longitudinal direction.

6. The assembly of claim 2, wherein the beam attachment is at least one of a channel and a protrusion with a longitudinal extension along the longitudinal direction.

7. The assembly of claim 6, wherein the at least one of the channel and the protrusion comprises at least one retaining surface which is configured to retain each one of the two or more vehicle frame attachments with respect to the at least one of the channel and the protrusion while the respective vehicle frame attachment is allowed to slide in the longitudinal direction along at least the section of the longitudinal extension of the structurally rigid elongated beam.

8. The assembly of claim 7, wherein each one of the two or more vehicle frame attachments comprises a first retainer, wherein the first retainer, in the second attachment state of the respective vehicle frame attachment with respect to the structurally rigid elongated beam, is configured to provide a retaining force between the at least one retaining surface and the respective vehicle frame attachment to prevent the vehicle frame attachment from sliding along the longitudinal direction.

9. The assembly of claim 2, wherein the structurally rigid elongated beam, on an outer periphery thereof, comprises at least one recess which extends in the longitudinal direction and is arranged to receive and support the elongated media such that the elongated media extends in the longitudinal direction along the longitudinal extension of the structurally rigid elongated beam.

10. The assembly of claim 9, wherein the at least one recess is at least partly formed by a first surface and a second surface of the outer periphery, wherein the first and second surfaces are inclined away from each other, as seen in a sectional plane which is perpendicular to the longitudinal direction.

11. The assembly of claim 9, wherein the at least one recess is at least partly V-shaped, as seen in a sectional plane which is perpendicular to the longitudinal direction.

12. The assembly of claim 9, wherein the structurally rigid elongated beam, on the outer periphery thereof, comprises two recesses which extend in the longitudinal direction, each one being arranged to receive and support the elongated media such that the elongated media extends in the longitudinal direction along the longitudinal extension of the structurally rigid elongated beam.

13. The assembly of claim 12, wherein the two recesses are provided on opposite sides of the outer periphery of the structurally rigid elongated beam.

14. The assembly of claim 2, further comprising at least one of the elongated media attached to the at least one elongated media attachment and at least one of the elongated media received in at least one recess which extends in the longitudinal direction and is arranged to receive and support the elongated media such that the elongated media extends in the longitudinal direction along the longitudinal extension of the structurally rigid elongated beam.

15. The assembly of claim 14, wherein the at least one of the elongated media received in the at least one recess has a circular or oval outer perimeter profile, as seen in a sectional plane which is perpendicular to the longitudinal direction.

16. The assembly of claim 15, wherein the at least one of the elongated media received in the at least one recess is a conduit for transporting a fluid.

17. The assembly of claim 1, wherein at least one of the two or more vehicle frame attachments comprises a first arm via which the at least one of the two or more vehicle frame attachments is configured to attach to the vehicle frame, wherein the first arm extends from the structurally rigid elongated beam such that the first arm and the structurally rigid elongated beam form a receiving space therebetween for receiving the elongated media.

18. The assembly of claim 1, wherein the structurally rigid elongated beam comprises or consists of one or more of the following: polymer and metal.

19. A vehicle comprising a vehicle frame which extends along a longitudinal direction of the vehicle, wherein the vehicle frame comprises:

a first and a second rail which are offset from each other in a transverse direction of the vehicle and which extend in the longitudinal direction between a front portion and a rear portion of the vehicle; and at least two crossbeams which extend in the transverse direction, connecting the first and second rails together, wherein the at least two crossbeams are offset from each other in the longitudinal direction;

wherein the vehicle further comprises the assembly of claim 1, wherein the longitudinal direction corresponds to the longitudinal direction of the vehicle and wherein one of the two or more vehicle frame attachments is attached to one of the at least two crossbeams and another one of the two or more vehicle frame attachments is attached to another one of the at least two crossbeams.

20. The vehicle of claim 19, wherein the assembly is located below the at least two crossbeams, as seen in a height direction of the vehicle, and preferably midway between the first and second rails, as seen in the transverse direction.

21. The assembly of claim 1, wherein the structurally rigid elongated beam has a uniform profile along at least the section at which the respective vehicle frame attachment is allowed to slide, as seen in sectional planes which are perpendicular to the longitudinal direction.

* * * * *